Patented May 9, 1950

2,507,195

UNITED STATES PATENT OFFICE 2,507,195

COMPOSITE SURFACING WELD ROD

Eric Winearls Colbeck and Daniel William Adams, Sheffield, England, assignors to Hadfields Limited, Sheffield, England No Drawing. Application February 19, 1949, Serial No. 77,434. In Great Britain February 20, 1948

4 Claims. (Cl. 219—8)

This invention relates to ferrous weld-metal compositions deposited by fusion welding processes and their manufacture and application, and is particularly concerned with the production and use of iron-base materials combining a high degree of toughness with good resistance to abrasion and impact at one and the same time.

Metallic materials are called on to withstand different kinds of abrasive conditions, for instance light abrasion or scouring as encountered in dry or wet sand, in ploughing, and in using earthworking equipment, and the heavier abrasion, frequently accompanied by impact, such as occurs in stone and ore crushing equipment, and tram and railway points and crossings. A number of ferrous and some non-ferrous materials have been specifically evolved to provide those characteristics best suited to minimise the destructive tendency of any particular set of conditions, and it has become established practice to apply these abrasion resisting materials by weld-deposition as a facing or overlay in many materials either on new parts or as a means of re-servicing worn parts.

Such wear resisting materials in common use at the present time, and applied by means of arc-welding electrodes or welding rods, are broadly of three types:

(a) Iron based alloys containing such elements as carbon, chromium, manganese, and tungsten.

(b) Cobalt based alloys containing such elements as carbon, chromium, and tungsten.

(c) Crushed tungsten carbide(s) in association with mild steel.

In type (c) it is common to employ an arc welding electrode or welding rod in the form of a tube of mild steel containing crushed tungsten carbide(s) and/or other hard carbides. The mild steel functions purely as a vehicle for deposition, embedding and supporting the particles of carbide(s). When deposited and subjected to wear, the more rapid wearing supporting mild steel exposes parts of the particles of the harder carbide(s), thus forming a wear resisting surface.

It is also known that whilst the existing abrasion resisting materials are effective against the particular form of abrasion for which they are designed or intended, it does not necessarily follow that the same efficiency is to be expected against another form of abrasion.

The original manganese steel, with very low silicon, (see Hadfield British specifications Nos. 200/83 and 21,705/96) is well known throughout the civilised world as a wear resisting material. In its normal and austenitic state, this material has a relatively low "mineral" hardness but is characterised by its property of becoming surface hardened to a high degree when subjected to cold work and impact. It is to this property, in conjunction with the fact that the underlying material retains its remarkable toughness and ductility, that its high resistance to abrasion and impact is due.

The air-toughening modifications of the original Hadfield manganese steel, of which the steel sold under the registered trade-mark Hadmang is an example, such steel having from 0.3 to 2.5% of silicon, has the important advantage of retaining its austenitic condition, or in other words, acquiring toughness and capacity for surface hardening by cold work and impact, by self cooling in air from a temperature of about 800° C. to 1150° C. according to relative metal section. This feature is used to advantage in applying the steel from arc welding electrodes and welding rods, also sold under the registered trade-mark Hadmang.

The present invention combines in ferrous weld-metal compositions deposited by fusion welding processes the toughness of iron-base materials having an austenitic structure (of which the above are given as examples) with increased resistance to abrasion and/or impact.

According to the present invention, an iron-base alloy having an austenitic structure is formed by fusion welding deposition with a dispersion of particles or areas of material having a higher (and preferably much higher) mineral hardness than the material of the austenitic matrix. (By "austenitic structure" is to be understood an iron-base alloy consisting of a solid solution of carbon, together with one or more metallic elements, such as manganese and nickel, in gamma iron, i. e. that modification of iron having a face-centered cubic structure, possessing an appreciable capacity for work-hardening.)

The carbide or other hard particles to be dispersed in the matrix may be formed as a coating and/or core on or in a rod of the matrix material, any of the usual methods of preparing welding electrodes or rods being employed as desired.

In the case of fusion weld-deposition by the electric arc and similar processes not normally employing a metallic electrode or welding rod, the wear resisting material may be applied as a mixture of austenitic material to form the matrix and the carbide(s) or other hard particles to be dispersed in it, the form of these materials depending on the particular fusion weld-deposition being employed and the required depth of superimposed wear resisting material.

The duplex material from the electrodes or rods or fused from the applied mixture combines a matrix of intrinsically tough material with a dispersion of particles or areas having inherent wear or abrasion resisting properties, and provides effective resistance to more than one form of abrasion.

The dispersed particles or areas may consist of one or more of the carbides of tungsten, boron, titanium, molybdenum, vanadium, tantalum, zirconium, or columbium (niobium), or other material appreciably harder than the austenitic matrix with which it is employed, being of a size suitable for providing the required dispersion as particles of the carbide or carbides as such, and/or a dispersion as other carbide precipitated from solution.

The proportions of the austenitic material and the dispersed particles may vary over wide limits, with either in preponderance. Preferably, however, the dispersed particles amount to at least 50% by weight of the duplex material; and for some purposes they may reach 90% or even more.

An example of a manganese steel matrix that may be used is a steel containing about 0.9–1.4% carbon, and 10–14% manganese, preferably about 1.25% carbon, and about 13% manganese.

For an air-toughening matrix, there may be used a steel containing about 0.3–0.85% of carbon, at least 0.3% silicon, 10–15% manganese, and 1½–4% nickel. Optionally, there may be up to 8% chromium. A preferred steel contains about 0.7% carbon, 0.7% silicon, 14% manganese, and 3.5% nickel.

The use of an air-toughening matrix lends itself particularly well to the formation and deposition of the duplex material from welding electrodes and rods, the matrix acquiring toughness simply during cooling. The use of arc-deposition is not, however, restricted to the use of air-toughening matrices, and it is a feature of the invention to produce the duplex material of whatever composition by fusion weld-deposition. If necessary, the required properties may be obtained or enhanced by subsequent operations serving to bring about work-hardening.

The added particles of harder material may be of substantially uniform size or may extend over a range of sizes according to the particular material employed. For example, when employing tungsten carbide(s), the particle size may range from 30 to 90 mesh (I. M. M.) Thus, the resultant duplex material may have a substantially uniform dispersion or dendritic pattern of particles of carbide eutectic of more or less uniform size, with or without areas or "islands" of the same particles, or it may have larger particles, alone or surrounded by smaller particles neither of which have been in solution but in each case contributing to the desired properties. The larger and not so large particles may congregate in the lower part of the deposited material, the upper part (containing little or none of the larger particles) showing the dendritic pattern referred to above. By "eutectic" is meant an alloy which has the lowest melting point of any combination of the particular constituents concerned. On progressive cooling of an alloy from the molten condition, the first solid phase to form is gamma iron, i. e., austenite. This continues to form until the remaining melt is of eutectic composition at which stage it solidifies as eutectic at a constant temperature. The carbide forms part of the eutectic since it is insoluble in the austenitic matrix and is precipitated as a separate phase.

As an example, one method of producing arc-welding electrodes to provide the duplex abrasion resisting weld metal in accordance with this invention is as follows:

To a core wire of the air toughening, austenitic manganese-nickel steel having an approximate composition of 0.7% carbon, 0.7% silicon, 13% manganese and 3.5% nickel (as sold under the registered trade-mark Hadmang) an approximately equal weight of crushed tungsten carbide(s) of a particle size varying from 30 to 90 mesh (I. M. M.) is applied as part of the usual flux coating of the electrode.

By fusion weld-deposition, an area or areas of tough, abrasion-resistant duplex material may be applied to any required thickness on steel articles for use under abrasive conditions. Such steel articles may themselves be of austenitic or other steel. Worn or insufficiently resistant articles may be restored or improved in this way, as well as the invention being applied to the manufacture of new articles. In addition to the manufacture or treatment of equipment of the types mentioned above, the fusion weld-deposition method according to the invention may be applied to the tipping of tools for lathes, planers, and other machine tools. The deposition may also be used to form separate articles intended to be attached by welding or brazing, or by bolting or other purely mechanical methods, to other metal articles.

In a typical weld deposit made according to the invention by the metallic arc process on austenitic manganese steel—which is commonly known throughout the world as Hadfield manganese steel—and containing approximately 1.2% carbon and 13% manganese a Vickers Diamond hardness of about 230 is obtained by taking a reading at a distance of about ⅛-inch below the weld junction. The junction itself is a well-defined line, though possibly a little irregular, and in the deposit above the junction the carbide introduced by way of the flux coating can be seen by inspection under modest magnification (say about ×25 diameters) to be a substantially uniform duplex structure of the carbide eutectic dispersed in the tough matrix formed from the metal supplied by the core. Examination of the deposit under greater magnification (say about ×250 diameters) shows the dendritic particles of carbide eutectic to be of more or less uniform size and forming a substantially uniform pattern—indicating substantially uniform dispersion.

This duplex material, which resists flaking and cracking to an unexpected degree when subjected to repeated impact, has a Vickers Diamond hardness of about 600 to 700 in the deposited state—a value considerably higher than that to be expected from austenite manganese steel after work hardening. Furthermore, the duplex material has capacity for work hardening.

Near the weld junction, there are found larger particles (in some cases large enough to be identified and checked for hardness by the Vickers Diamond method) and some smaller particles; neither the large nor the small particles have been in solution, but they each contribute to the desired properties of abrasion resistance afforded by the main bulk of the deposit.

When the term "rods" is used in the appended claims, it is to be understood as including "electrodes."

What we claim is:

1. A welding rod comprising an austenitic manganese steel weld-metal base in combination with a mass containing fine particles of a carbide of at least one metal selected from the group consisting of tungsten, boron, titanium, molybdenum, vanadium, tantalum, zirconium, and columbium (niobium).

2. A welding rod comprising a weld-metal base of austenitic manganese steel containing from 0.9-1.4% carbon, and 10-14% manganese and, in combination with said base, a mass containing fine particles of a carbide of at least one metal selected from the group consisting of tungsten, boron, titanium, molybdenum, vanadium, tantalum, zirconium, and columbium (niobium).

3. A welding rod comprising a weld-metal base of austenitic air-toughening manganese-nickel steel containing from 0.3-0.85% carbon, at least 0.3% silicon, 10-15% manganese, and 1½-4% nickel, and, in combination with said base, a mass containing fine particles of a carbide of at least one metal selected from the group consisting of tungsten, boron, titanium, molybdenum, vanadium, tantalum, zirconium, and columbium (niobium).

4. A welding rod comprising a weld-metal base of austenitic air-toughening manganese nickel steel containing from 0.3-0.85% carbon, at least 0.3% silicon, 10-15% manganese, 1½-4% nickel, and up to 8% chromium, and, in combination with said base, a mass containing fine particles of a carbide of at least one metal selected from the group consisting of tungsten, boron, titanium, molybdenum, vanadium, tantalum, zirconium, and columbium (niobium).

ERIC WINEARLS COLBECK.
DANIEL WILLIAM ADAMS.

REFERENCES CITED

The following references are of record in the file of this patent:

UNITED STATES PATENTS

| Number | Name | Date |
| --- | --- | --- |
| 1,757,601 | Stoody et al. | May 6, 1930 |
| 1,977,128 | Hawkins | Oct. 16, 1934 |
| 2,002,462 | Woods | May 21, 1935 |
| 2,026,468 | Hall | Dec. 31, 1935 |
| 2,038,178 | Jerabek | Apr. 21, 1936 |
| 2,204,412 | Hinnuber | June 11, 1940 |
| 2,219,462 | Wissler | Oct. 29, 1940 |
| 2,280,223 | Dumpelmann et al. | Apr. 21, 1942 |
| 2,329,986 | Goodford | Sept. 21, 1943 |
| 2,408,619 | Friedlander | Oct. 1, 1946 |
| 2,471,931 | Castro et al. | May 31, 1949 |

FOREIGN PATENTS

| Number | Country | Date |
| --- | --- | --- |
| 478,623 | Great Britain | Jan. 21, 1938 |